Aug. 26, 1941.  G. T. PERRY  2,253,806
SIFTER
Filed May 18, 1940
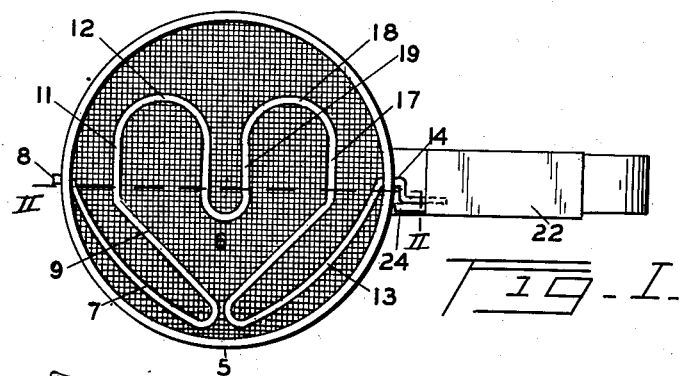
Fig. I.
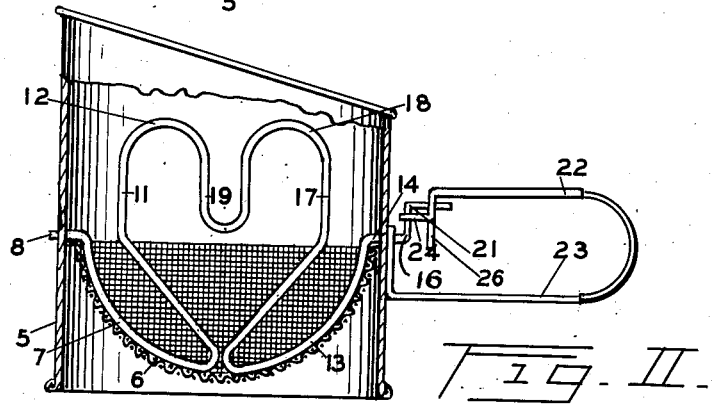
Fig. II.
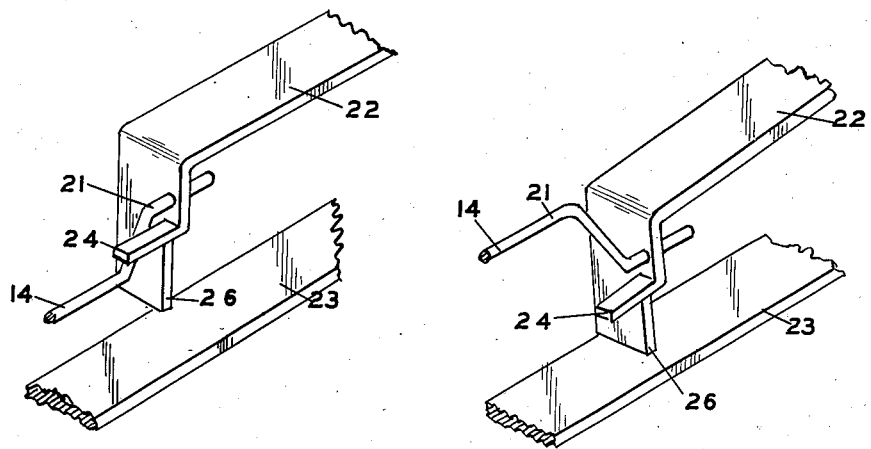
Fig. III.  Fig. IV.
INVENTOR
GLENN T. PERRY
BY
ATTY.

Patented Aug. 26, 1941 2,253,806

UNITED STATES PATENT OFFICE 2,253,806

SIFTER

Glenn T. Perry, San Francisco, Calif.

Application May 18, 1940, Serial No. 335,949

2 Claims. (Cl. 209—282)

This invention relates to improvements in sifting and mixing devices and has particular reference to a device for mixing various ingredients and then passing the same through a sifting arrangement so that the various ingredients will be properly aerated and also mixed.

A further object of the invention is to provide means for limiting the amount of movement of the agitating element so that a proper mixing will occur and yet the contents will not be spilled over the top of the device.

A further object of the invention is to produce a device which is economical to construct, easy to actuate, and one which may be easily cleaned.

A further object of the invention is to provide the operating element in such a position that it will occupy that of a normal horizontal handle, thus making it easier to hold and actuate the device.

Other objects and advantages will be apparent during the course of the following description.

In the accompanying drawing forming a part of this specification and in which like numerals are employed to designate like parts throughout the same, Fig. 1 is a top plan view of my device;

Fig. 2 is a cross sectional view taken on the line 2—2 of Fig. 1 the agitator being shown in full lines in its 45° position;

Fig. 3 is a fragmentary detailed view, showing the handle in its normal or elevated position and acting as a stop against the crank of the agitator element; and Fig. 4 is a similar view, showing the handle in depressed position with the down-turned portion acting as a stop.

In the mixing of ingredients, such as flour, corn-meal, baking powder, soda, etc., it is common to place these various ingredients in a sifter and to then shake the sifter so that the ingredients pass therethrough and are sifted, aerated, and mixed. However, it is common practice to place a given quantity of flour in the sifter first and to then add other ingredients. Consequently, there is no thorough mixing of the various ingredients as there is in my device.

In my device I employ an agitating element which has a curved portion engaging the screen and further provided with an upstanding portion which passes through the commodity being sifted and terminates in a downwardly extending portion extending into the commodity so that when the agitator is rocked back and forth, the entire mass within the device will be thoroughly agitated, causing a mixture of the various commodities. I have further provided a handle which by squeezing actuates this agitator throughout a definite movement.

In the accompanying drawing wherein for the purpose of illustration is shown a preferred embodiment of my invention, the numeral 5 designates the body of the device, which is in reality a tubular container having a screen 6 positioned therein. This type of sifting device is common, and I make no claim thereto.

My invention consists of a sifter and an operating element therefor. My agitator is preferably formed of wire which is bent so as to form a curved portion 7 integral with a stub end 8 which forms one of the pivots for the agitator. This curved portion 7 extends downwardly and in parallelism with the curved surface of the screen 6 to a point adjacent the bottom of the screen, it is then bent upwardly at an angle of substantially 45°, as shown at 9, thence upwardly in a substantially vertical direction, as shown at 11. This wire is then curved, as shown at 12. A similar curved portion is shown at 13 having a horizontal pivotal portion 14 and having an upwardly extending angular portion 16, a vertical portion 17, and a curved portion 18. The curved portions 18 and 12 are joined by a U-shaped depending mixing element 19. The pivotal portion 14 is connected to a crank 21 extending through the down-turned end of the handle. This handle is substantially U-shaped and is provided with legs 22 and 23, the leg 23 being elongated and having the extremity thereof bent at right angles so as to parallel the body 5 and to be connected thereto. The leg 22 is bent downwardly toward the leg 23 and is split, one portion thereof being bent at right angles parallel to the leg 23 and forming a stop 24 against which the crank 21 may contact. The end 26 forms a stop to limit the movement of the leg 22 toward the leg 23.

The result of this construction is that when the parts are in the normal position, as shown in Fig. 2, the spring of the U-shaped handle will cause the legs 22 and 23 to lie substantially parallel one with the other, at which time the stop 24 will engage the crank 21. This will hold the agitator in one definite position.

We will now assume that various ingredients have been placed within the device resting upon the screen 6. The operator now grasps the handle, which is in a normal horizontal position and easy to manipulate. By pressing downwardly with the thumb of the hand upon the leg 22, movement will be imparted to the crank 21, rotating the same about the pivotal parts 8 and 14, causing the curved portions 7 and 13 to move over the surface of the screen 6 to force the ingredients therethrough. At the same time, the downwardly extending mixing element will move back and forth through the ingredients, stirring them so as to cause a good mixing of whatever different ingredients may be positioned within the mixture. When the handle has been compressed as far as possible, the stop 26 will engage the leg 23 and prevent further movement of the agitating element. The stops 24 and 26 limit the pivotal movement of the agitator and thus prevent the agitator from throwing the ingredients out of the sifter, as would be done if the agitator were permitted to move more than a certain amount.

It will thus be seen that I have produced a device which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device for mixing and sifting commodities comprising a cylindrical body portion, a screen having a semi-circular cross section disposed therein, an agitator element comprising a pivotal portion, a curved portion connected thereto and engaging the curved surface of said screen to a point near the bottom thereof, said agitator then being bent diagonally upward to a point in alignment with the axis of said pivotal portion, thence upwardly in a vertical direction, thence curved in a triple return bend to form a downwardly extending mixing element, thence diagonally downwardly, thence curved to engage the curved surface of said screen, and thence bent to form a second pivotal portion, one of said pivotal portions having a crank connected thereto, and a handle engaging said crank, said handle having stops to limit the pivotal movement of said crank.

2. A device for mixing and stirring finely ground commodities consisting of a cylindrical body portion, a screen having a semi-circular cross section disposed therein, an agitator element comprising offset pivotal portions, one of said pivotal portions having a crank connected thereto, curved portions extending away from said pivotal portions and toward each other and contacting said screen, said agitator having a central portion upon said curved portions extending upwardly from said screen and terminating in a downwardly extending mixing element, whereby the contents of said device will be agitated when said agitator is actuated, and means for actuating said agitator from a point outside said body portion, said means comprising a U-shaped handle, one of the legs of the U-shaped handle being rigidly connected to said body portion in such a manner that the legs lie in a substantially horizontal position, the other leg of said U-shaped handle being bent downwardly toward the other leg and pivotally connected to said crank, said downwardly bent portion being split, one portion thereof being bent at right angles to form a stop against which the crank of said agitator element engages when said free leg is in its normal position, and the downwardly bent portion forming a stop when the legs are moved toward each other.

GLENN T. PERRY.